United States Patent
Xu et al.

(10) Patent No.: US 10,205,373 B2
(45) Date of Patent: Feb. 12, 2019

(54) SELF-ALIGNMENT PROTECTION DEVICE FOR PERMANENT-MAGNET COUPLING

(71) Applicant: JIANGSU MAGNET VALLEY TECHNOLOGIES CO., LTD. (CN), Jiangsu (CN)

(72) Inventors: Junfeng Xu, Jiangsu (CN); Fuxing Qi, Jiangsu (CN)

(73) Assignee: JIANGSU MAGNET VALLEY, Jiangsu (CN)

( * ) Notice: Subject to any disclaimer, the term of this patent is extended or adjusted under 35 U.S.C. 154(b) by 323 days.

(21) Appl. No.: 15/312,539

(22) PCT Filed: Feb. 5, 2015

(86) PCT No.: PCT/CN2015/072309
§ 371 (c)(1),
(2) Date: Nov. 18, 2016

(87) PCT Pub. No.: WO2015/176559
PCT Pub. Date: Nov. 26, 2015

(65) Prior Publication Data
US 2017/0098990 A1 Apr. 6, 2017

(30) Foreign Application Priority Data
May 21, 2014 (CN) .......................... 2014 1 0215313

(51) Int. Cl.
*H02K 49/10* (2006.01)
*H02K 51/00* (2006.01)
(Continued)

(52) U.S. Cl.
CPC ........... *H02K 49/106* (2013.01); *H02K 15/16* (2013.01); *H02K 51/00* (2013.01); *H02K 7/003* (2013.01);
(Continued)

(58) Field of Classification Search
CPC ..... H02K 49/106; H02K 49/108; H02K 7/003
(Continued)

(56) References Cited

U.S. PATENT DOCUMENTS 7,804,263 B2 * 9/2010 Himmelmann .......... H02K 7/12
290/34
7,863,789 B2 * 1/2011 Zepp .................... H02K 21/024
310/190
(Continued)

FOREIGN PATENT DOCUMENTS

CN 202197206 4/2012
CN 102931810 2/2013
(Continued)

OTHER PUBLICATIONS

PCT Search Report dated May 6, 2015 for corresponding PCT International Application No. PCT/CN2015/072309, 8 pages.

*Primary Examiner* — Gary A Nash
(74) *Attorney, Agent, or Firm* — Lee & Hayes, P.C.

(57) ABSTRACT

The present invention relates to the technical field of design and manufacture of magnetic couplings and provides a self-alignment protection device for permanent-magnet coupling, the self-alignment protection device comprises a first rotor and a second rotor respectively in fixedly connection with a load shaft (8) and a driving shaft (9), the first rotor and the second rotor being respectively mounted with permanent magnets that are mutually coupled to transmit torque, the first rotor and the second rotor are respectively configured with an inner conical surface and an outer conical surface that are coaxial and have mutually matching tapers, the self-alignment protection device further comprises an axial adjustment mechanism for adjusting the relative axial position between the first rotor and the second rotor. This technical solution solves the technical problem that the existing magnetic couplings are inconvenient to install and adjust.

10 Claims, 1 Drawing Sheet

(51) Int. Cl.
*H02K 15/16* (2006.01)
*H02K 7/00* (2006.01)

(52) U.S. Cl.
CPC ....... *H02K 49/108* (2013.01); *H02K 2201/03* (2013.01)

(58) Field of Classification Search
USPC .................. 310/76–78, 92, 100, 102 A, 103
See application file for complete search history.

(56) References Cited

U.S. PATENT DOCUMENTS

| | | | |
|---|---|---|---|
| 9,490,736 B2 * | 11/2016 | Han | H02P 9/02 |
| 2004/0021385 A1 * | 2/2004 | Six | H02K 49/106 |
| | | | 310/105 |
| 2007/0241628 A1 * | 10/2007 | Himmelmann | H02K 21/027 |
| | | | 310/190 |

FOREIGN PATENT DOCUMENTS

| CN | 103326541 | 9/2013 |
|---|---|---|
| CN | 103441644 | 12/2013 |
| CN | 104038020 | 9/2014 |
| CN | 203933339 | 11/2014 |
| CN | 101867279 | 10/2016 |

* cited by examiner

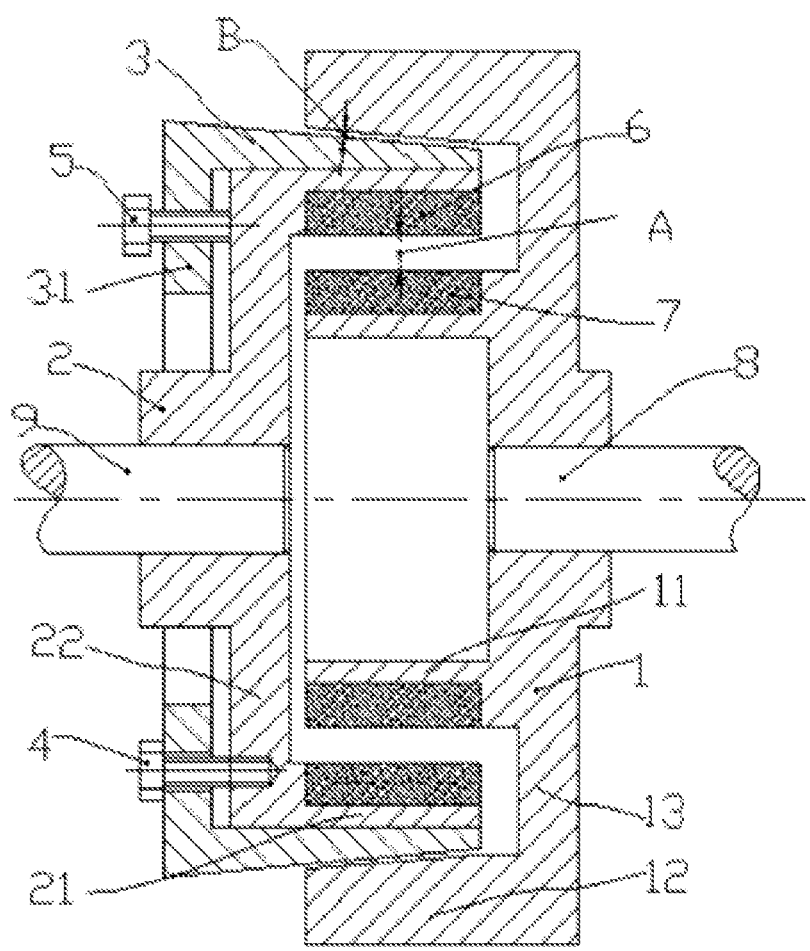

SELF-ALIGNMENT PROTECTION DEVICE FOR PERMANENT-MAGNET COUPLING

TECHNICAL FIELD

The present invention relates to the technical field of design and manufacture of couplings, and in particular relates to a self-alignment protection device for permanent-magnet coupling.

BACKGROUND TECHNOLOGY

Couplings are widely used in various general machineries for connecting two shafts and transmitting torque and motion, so that the two shafts rotate synchronously. Traditional couplings requires interconnection between a driving shaft and a driven shaft to transmit torque, which has complicated structure and requires high manufacturing precision, and damage of components is easily caused by overload. Especially, when the driving shaft and the driven shaft need to work in two different media that are isolated from each other, a sealing member must be used for dynamic seal, and as a result, either that the rotation resistance needs to be increased to ensure reliable seal, or that the seal is not tight enough to prevent leakage. In addition, along with wear and aging of the sealing member, the leakage would become more serious, and especially in a system where a harmful gas (or liquid) exists, the leakage would contaminate the environment and endanger lives.

A magnet coupling, which is a non-contact coupling with a structural form that is different from traditional couplings, utilizes a brand new principle of magnetic interaction to transmit force and torque between a driving shaft and a driven shaft without direct contact, and is able to convert dynamic seal into static seal with zero leakage. Therefore, magnet couplings are widely used on occasions that have special requirements against leakage, and have entered a massive commercialization stage.

According to different setting locations of interacting magnets, magnet couplings are classified into planar magnet couplings and coaxial magnet couplings. Currently, coaxial magnet couplings on the market have the following basic structure: steel magnets are respectively mounted on an inner rotor and an outer rotor, the inner rotor is fixed on a load shaft, and the outer rotor is fixed on a driving shaft. Because the steel magnets are generally made of magnetic material with strong magnetism, commonly used magnet couplings is extremely inconvenient to install and adjust due to influence of magnetic force thereof. In order to cope with the aforementioned problem, the structure of magnet coupling is designed such that the inner and outer rotors are connected as a whole, for example, Chinese patent literature CN103904860A discloses a sleeve-type permanent-magnet vortex coupling that has its inner and outer rotors connected by a bearing, however, such a bearing causes increased structural complexity and product cost of the coupling, and when the two rotors rotate together during operation of the coupling, once slipping occurs due to eccentricity between the rotors, direct friction between the steel magnets on the two rotors would damage the steel magnets and even damage the entire coupling device, and on the other hand, if the two rotors are attracted to stick together accidentally during mounting, it is extremely difficult to separate the two rotors, especially for magnet couplings which transmits a large torque, e.g., for a magnet coupling that transmits a torque of thousands of Newton-meter, the attraction force of its rotors "sticking" together is tens of thousands Newton. Because of the aforementioned reasons, the magnet couplings of prior art is inconvenient to install and adjust and is unsuitable to be popularized.

SUMMARY OF THE INVENTION

Thus, the present invention solves the technical problem that the existing magnet couplings are inconvenient to install and adjust, and accordingly provides a self-alignment protection device for permanent-magnet coupling that is easy to install and adjust and also transmits torque steadily and reliably.

In order to solve the above-mentioned technical problem, the present invention provides a self-alignment protection device for permanent-magnet coupling, which comprises a first rotor and a second rotor respectively in fixed connection with a load shaft and a driving shaft, the first rotor and the second rotor are respectively mounted with permanent magnets that are mutually coupled to transmit torque, wherein, the first rotor and the second rotor are respectively configured with an inner conical surface and an outer conical surface that are coaxial and have mutually matching tapers, and the device further comprises an axial adjustment mechanism for adjusting the relative axial position between the first rotor and the second rotor. The axial adjustment mechanism comprises a first adjustment unit adapted for making the first rotor move towards the second rotor in the axial direction, as well as a second adjustment unit adapted for making the first rotor move away from the second rotor in the axial direction. Wherein, the first rotor is an inner permanent-magnet rotor (1) connected to the load shaft (8) or the driving shaft (9), the outer conical surface is formed on the inner permanent-magnet rotor (1), the second rotor comprises an outer permanent-magnet rotor connected to the driving shaft (9) or the load shaft (8), the inner conical surface is formed on the outer permanent-magnet rotor.

Preferably, the inner permanent-magnet rotor has an inner sleeve and an outer sleeve that are coaxial as well as a connection plate for interconnecting the inner sleeve and the outer sleeve, an external permanent magnet is configured on an external wall of the inner sleeve, the inner conical surface is formed on an internal wall of the outer sleeve, and the load shaft or driving shaft is connected with the connection plate at a side away from the inner sleeve and the outer sleeve; the second rotor further comprises an outer taper sleeve sleeved on the outer permanent-magnet rotor, the outer permanent-magnet rotor has a sleeve and a rotary plate disposed on an end face of the sleeve, an internal permanent magnet is configured on an internal wall of the sleeve, the outer conical surface is formed on an external wall of the outer taper sleeve, and the driving shaft or the load shaft is connected with the rotary plate at a side away from the sleeve.

Preferably, the outer taper sleeve is in clearance fit with the sleeve.

Preferably, the axial adjustment mechanism comprises an adjustment plate configured parallel to the rotary plate of the outer permanent-magnet rotor, the adjustment plate is in fixed connection with the outer taper sleeve, the adjustment plate is in threaded connection with the outer permanent-magnet rotor via a first screw bolt; the adjustment plate is also provided with a second screw bolt that is screwed therein, and an end portion of the second screw bolt is pressed against the rotary plate. The outer taper sleeve and the adjustment plate are integrally formed in one piece.

Preferably, the adjustment plate is formed with a through-hole, the outer permanent-magnet rotor is correspondingly formed with a screw hole that is coaxial with the through-hole, the first screw bolt passes through the through-hole and is connected into the screw hole, the through-hole has a diameter larger than that of the first screw bolt.

Preferably, an air gap A is formed between the external wall of the inner sleeve of the inner permanent-magnet rotor and the sleeve of the outer permanent-magnet rotor, the air gap A is in a range of 2 mm-5 mm.

Preferably, an air gap B is formed between the internal wall of the outer taper sleeve and the external wall of the inner sleeve of the inner permanent-magnet rotor, the air gap B is in a range of 0.3 mm-0.8 mm.

Preferably, the axial adjustment mechanism comprises a first adjustment unit adapted for making the first rotor move towards the second rotor in the axial direction, as well as a second adjustment unit adapted for making the first rotor move away from the second rotor in the axial direction.

Preferably, the first rotor is an inner permanent-magnet rotor connected to the load shaft or the driving shaft, the inner permanent-magnet rotor has an inner sleeve and an outer sleeve that are coaxial as well as a connection plate for interconnecting the inner sleeve and the outer sleeve, an external permanent magnet is configured on an external wall of the inner sleeve, the inner conical surface is formed on an internal wall of the outer sleeve, and the load shaft or driving shaft is connected with the connection plate at a side away from the inner sleeve and the outer sleeve; the second rotor comprises an outer permanent-magnet rotor connected to the driving shaft or the load shaft as well as an outer taper sleeve sleeved on the outer permanent-magnet rotor, the outer permanent-magnet rotor has a sleeve and a rotary plate disposed on an end face of the sleeve, an internal permanent magnet is configured on an internal wall of the sleeve, the outer conical surface is formed on an external wall of the outer taper sleeve, and the driving shaft or the load shaft is connected with the rotary plate at a side away from the sleeve; the first adjustment unit comprises an adjustment plate configured parallel to the rotary plate and in fixed connection with the outer taper sleeve, as well as a first screw bolt that connects the adjustment plate to the outer permanent-magnet rotor in a screw-threaded manner; the second adjustment unit comprises a second screw bolt that is screwed in the adjustment plate, with one end portion of the second screw bolt pressing against the rotary plate.

Compared to prior art, the aforementioned technical solution of the present invention has the following advantages:

(1) The self-alignment protection device for permanent-magnet coupling in accordance with the present invention has two rotors that are matched by corresponding conical surfaces, and the relative axial position between the two rotors is adjusted by an axial adjustment mechanism. When mounting a driving shaft and a load shaft, the axial adjustment mechanism connects the two rotors into a whole piece, thereby facilitate the installation of the driving shaft and the load shaft. During operation, the axial adjustment mechanism keeps the two rotors apart and ensures reliable movement linkage of the two rotors. The present invention utilizes an automatic centering principle of matched conical surfaces to ensure coaxiality of the two permanent-magnet rotors, so as to ensure uniformity of air gap between permanent magnets on the two rotors, thereby ensuring the coupling performance of the magnet coupling.

(2) The self-alignment protection device for permanent-magnet coupling in accordance with the present invention has permanent magnets respectively configured on the inner sleeve of the inner permanent-magnet rotor and on the internal wall of the sleeve of the outer permanent-magnet rotor, and the internal wall of the outer sleeve of the inner permanent-magnet rotor has a conical surface that matches a corresponding conical surface of the outer taper sleeve sleeved on the outer permanent-magnet rotor, therefore, the steel magnet on the inner permanent-magnet rotor and the steel magnet on the outer permanent-magnet rotor would never be attracted to stick together, thereby avoiding the situation that the two rotors get "stuck" together and become very difficult to separate; even if transverse displacement of the driving shaft or the load shaft occurs and causes slipping between the inner rotor and the outer rotor, no friction between the steel magnet on the inner rotor and the steel magnet on the outer rotor would be caused, and thus the steel magnets are protected from being damaged, thereby ensuring safety of the magnet coupling.

(3) The axial adjustment mechanism in accordance with the present invention comprises an adjustment plate connected to the outer taper sleeve, the adjustment plate is in threaded connection with the outer permanent-magnet rotor via a first screw bolt, thereby being able to make the first rotor and the second rotor move towards each other in the axial direction until connected into a whole piece, so as to mount the driving shaft and the load shaft. The adjustment plate is also provided with a second screw bolt that is screwed therein, an end portion of the second screw bolt is pressed against the rotary plate of the outer permanent-magnet rotor, the outer taper sleeve can be moved away from the inner permanent-magnet rotor in the axial direction by adjusting the second screw bolt, thereby being able to separate the first rotor and the second rotor, so that the coupling can work reliably. This axial adjustment mechanism has simple structure and low production cost, is easy to adjust, works reliably, has low requirements for mounting precision, and makes the magnet coupling transmit torque steadily and reliably, with reliable protection even if accidental slipping of the coupling occurs due to eccentricity between the rotors.

BRIEF DESCRIPTION OF THE DRAWINGS

In order to make the subject matter of the present invention easy and clear to understand, hereinafter, the present invention will be further described in detail according to specific embodiments of the present invention and with reference to the appended drawing, wherein:

FIG. 1 is a structural schematic diagram of a self-alignment protection device for permanent-magnet coupling in accordance with the present invention.

The reference numerals in the drawing are explained as follows: 1—inner permanent-magnet rotor, 11—inner sleeve, 12—outer sleeve, 13—connection plate, 2—outer permanent-magnet rotor, 21—sleeve, 22—rotary plate, 3—outer taper sleeve, 31—adjustment plate, 4—first screw bolt, 5—second screw bolt, 6—internal permanent magnet, 7—external permanent magnet, 8—load shaft, 9—driving shaft.

DETAILED DESCRIPTION OF EMBODIMENTS

Hereinafter, the present invention is further described in specific embodiments, with reference to the appended drawing.

FIG. 1 shows a self-alignment protection device for permanent-magnet coupling in accordance with the present invention, which comprises a first rotor and a second rotor respectively in fixed connection with a load shaft and a driving shaft, the first rotor and the second rotor are respectively mounted with permanent magnets that are mutually coupled to transmit torque, the first rotor and the second rotor are respectively configured with an inner conical surface and an outer conical surface that are coaxial and have mutually matching tapers, and the device further comprises an axial adjustment mechanism for adjusting the relative axial position between the first rotor and the second rotor.

The above-mentioned is the core technical solution of the present invention. When mounting the driving shaft and the load shaft with the coupling, the axial adjustment mechanism makes the first rotor and the second rotor move towards each other in the axial direction, and because the first and second rotors are respectively configured with mutually matching inner and outer conical surfaces, the two rotors can be connected into a whole piece after being moved close to each other in the axial direction, thereby facilitating the installation of the driving shaft and the load shaft. After the driving shaft and the load shaft have been mounted, the axial adjustment mechanism makes the first rotor and the second rotor move away from each other in the axial direction, thereby separating the two rotors apart, and then the permanent magnets disposed oppositely on the two rotors can ensure reliable movement linkage of the two rotors. The present invention utilizes an automatic centering principle of matched conical surfaces to ensure coaxiality of the two permanent-magnet rotors, so as to ensure uniformity of air gap between permanent magnets on the two rotors, thereby ensuring the coupling performance of the magnet coupling. Because the fit clearance between the two conical surfaces is far less in thickness than the air gap between the two permanent magnets, it is ensured that the two permanent magnets never become stuck together during installation.

The specific and preferable structure of the above-mentioned technical solution of the present invention is as follows:

The first rotor is an inner permanent-magnet rotor 1 connected to a load shaft 8, and the second rotor comprises an outer permanent-magnet rotor 2 connected to a driving shaft 9 as well as an outer taper sleeve 3 sleeved on the outer permanent-magnet rotor 2. Those skilled in the art would understand that, the inner permanent-magnet rotor 1 may also be connected to a driving shaft 9, and correspondingly, the outer permanent-magnet rotor 2 may also be connected to a load shaft 8.

Wherein, the inner permanent-magnet rotor 1 has an inner sleeve 11 and an outer sleeve 12 that are coaxial as well as a connection plate 13 for interconnecting the inner sleeve 11 and the outer sleeve 12, the load shaft 8 is connected with the connection plate 13 at a side away from the inner sleeve 11 and the outer sleeve 12; the outer permanent-magnet rotor 2 has a sleeve 21 and a rotary plate 22 disposed on an end face of the sleeve 21, the driving shaft 9 is connected with the rotary plate 22 at a side away from the sleeve 21.

The permanent magnets include an external permanent magnet 7 configured on an external wall of the inner sleeve 11 of the inner permanent-magnet rotor 1, and an internal permanent magnet 6 configured on an internal wall of the sleeve 21 of the outer permanent-magnet rotor 2. These two permanent magnets are disposed oppositely and spaced apart.

The inner conical surface is formed on an internal wall of the outer sleeve 12 of the inner permanent-magnet rotor 1, and the outer conical surface is formed on an external wall of the outer taper sleeve 3.

The axial adjustment mechanism comprises a first adjustment unit adapted for making the first rotor move towards the second rotor in the axial direction, as well as a second adjustment unit adapted for making the first rotor move away from the second rotor in the axial direction. In this embodiment, the axial adjustment mechanism comprises an adjustment plate 31 configured parallel to the rotary plate 22 of the outer permanent-magnet rotor 2, the adjustment plate 31 is in fixed connection with the outer taper sleeve 3, the adjustment plate 31 is in threaded connection with the outer permanent-magnet rotor 2 via a first screw bolt 4, and the aforementioned structure forms the first adjustment unit which moves the first rotor and the second rotor towards each other in the axial direction until they are connected into one whole piece, so as to mount the driving shaft 9 and the load shaft 8. The adjustment plate 31 is also provided with a second screw bolt 5 that is screwed therein, an end portion of the second screw bolt 5 is pressed against the rotary plate 22, and the aforementioned structure forms the second adjustment unit, because the outer taper sleeve 3 is in clearance fit with the sleeve 21, in other words, the outer taper sleeve 3 can slide relative to the sleeve 21, thus, the outer taper sleeve 3 can be moved away from the inner permanent-magnet rotor 1 in the axial direction by adjusting the second screw bolt 5, thereby separating the first rotor and the second rotor apart, so that the coupling can work reliably.

The aforementioned axial adjustment mechanism has simple structure and low production cost, is easy to adjust, and works reliably, In order to further reduce the production cost, the outer taper sleeve 3 and the adjustment plate 31 are integrally formed in one piece. In other embodiments, the outer taper sleeve 3 may be connected to the adjustment plate 31 by other fixed connection means, such as welded connection or threaded connection. The adjustment plate 31 is formed with a through-hole, the outer permanent-magnet rotor 2 is correspondingly formed with a screw hole that is coaxial with the through-hole, the first screw bolt 4 passes through the through-hole and is connected into the screw hole. Wherein, the through-hole has a diameter larger than that of the screw hole.

An air gap A is formed between the external wall of the inner sleeve of the inner permanent-magnet rotor and the sleeve 21 of the outer permanent-magnet rotor 2, the air gap A is in a range of 2 mm-5 mm, and is preferably 3 mm in this embodiment. The air gap A should meet design requirements of the magnetic coupling. An air gap B is formed between the internal wall of the outer taper sleeve and the external wall of the inner sleeve of the inner permanent-magnet rotor, the air gap B is in a range of 0.3 mm-0.8 mm, and is preferably 0.5 mm in this embodiment. The configuration of the air gap B can be determined according to the condition of radial run-out between the driving shaft and the load shaft that are particularly used.

The data of the specific embodiment of the present invention is as follows:

Main technical parameters: Rated power: 315 kW

Rated speed: 1500 rpm

Rated torque: 2032.6 N·m

Considering that the maximum overload torque of a common asynchronous motor is 1.8 times the rated torque, thus the maximum design torque of the magnet coupling is larger than or equal to 3658.7 N·m.

Main design parameters: Number of poles: 24P

Maximum outer diameter: Φ400 mm

Air gap A: 3 mm; air gap B: 0.5 mm

Outer diameter of the inner rotor: Φ280 mm

Axial length of the steel magnet: 75 mm

The specific operation process of the above-mentioned self-alignment protection device for permanent-magnet coupling is as follows:

First, the second screw bolt 5 is loosened, the first screw bolt 4 is screwed and pressed to move the outer taper sleeve 3 towards the right along its axis, thereby making the air gap B between the inner permanent-magnet rotor 1 and the outer taper sleeve 3 become zero, so that the first rotor and the second rotor form one whole piece by fitting of matched conical surfaces under strong magnetic force, and coaxiality between the first rotor and the second rotor is ensured by press fit of the conical surfaces, thereby ensuring uniformity of the air gap A and thus ensuring the optimal performance of the magnet coupling. After the driving shaft 9 and the load shaft 8 have been properly mounted, the first screw bolt 4 is loosened, the second screw bolt 5 is screwed and pressed to move the outer taper sleeve 3 towards the left along its axis, so as to adjust the air gap B whose size depends on the condition of radial run-out between the driving shaft 9 and the load shaft 8 that are particularly used. After the air gap B is properly adjusted, the first screw bolt 4 is locked tightly, and then the magnet coupling can start to work. As such, FIG. 1 is a schematic diagram showing the working state of this magnet coupling.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A permanent-magnet coupling self-alignment protection device, comprising a first rotor and a second rotor respectively in fixed connection with a load shaft and a driving shaft, the first rotor and the second rotor being respectively mounted with permanent magnets that are mutually coupled to transmit torque, wherein:
   the first rotor and the second rotor are respectively configured with an inner conical surface and an outer conical surface that are coaxial and have mutually matching tapers;
   the device further comprises an axial adjustment mechanism for adjusting the relative axial position between the first rotor and the second rotor,
   the permanent magnets are mot mounted on the inner conical surface or the outer conical surface, so that no torque is transmitted between the inner conical surface and the outer conical surface.

2. The permanent-magnet coupling self-alignment protection device in accordance with claim 1, characterized in that, the axial adjustment mechanism comprises a first adjustment unit adapted for making the first rotor move towards the second rotor in the axial direction, as well as a second adjustment unit adapted for making the first rotor move away from the second rotor in the axial direction.

3. The permanent-magnet coupling self-alignment protection device in accordance with claim 1, wherein:
   the first rotor is an inner permanent-magnet rotor (1) connected to the load shaft (8) or the driving shaft (9),
   the second rotor comprises an outer permanent-magnet rotor (2) and an outer taper sleeve (3), wherein the outer permanent-magnet rotor (2) is connected to the driving shaft (9) or the load shaft (8), and the outer taper sleeve (3) is sleeved on the outer permanent-magnet rotor (2), the axial adjustment mechanism is adapted for adjusting the relative axial position between the inner permanent-magnet rotor (1) and the outer taper sleeve (3).

4. The permanent-magnet coupling self-alignment protection device in accordance with claim 3, characterized in that,
   the inner permanent-magnet rotor (1) has an inner sleeve (11) and an outer sleeve (12) that are coaxial as well as a connection plate (13) for interconnecting the inner sleeve (11) and the outer sleeve (12), an external permanent magnet (7) is configured on an external wall of the inner sleeve (11), the inner conical surface is formed on an internal wall of the outer sleeve (12), and the load shaft (8) or driving shaft (9) is connected with the connection plate (13) at a side away from the inner sleeve (11) and the outer sleeve (12);
   outer permanent-magnet rotor (2) has a sleeve (21) and a rotary plate (22) disposed on an end face of the sleeve (21), an internal permanent magnet (6) is configured on an internal wall of the sleeve (21), the outer conical surface is formed on an external wall of the outer taper sleeve (3), and the driving shaft (9) or the load shaft (8) is connected with the rotary plate (22) at a side away from the sleeve (21).

5. The permanent-magnet coupling self-alignment protection device in accordance with claim 4, characterized in that, the outer taper sleeve (3) is in clearance fit with the sleeve (21).

6. The permanent-magnet coupling self-alignment protection device in accordance with claim 4, characterized in that, the axial adjustment mechanism comprises an adjustment plate (31) configured parallel to the rotary plate (22) of the outer permanent-magnet rotor (2), the adjustment plate (31) is in fixed connection with the outer taper sleeve (3), the adjustment plate (31) is in threaded connection with the outer permanent-magnet rotor (2) via a first screw bolt (4); the adjustment plate (31) is also provided with a second screw bolt (5) that is screwed therein, and an end portion of the second screw bolt (5) is pressed against the rotary plate (22).

7. The, permanent-magnet coupling self-alignment protection device in accordance with claim 6, characterized in that, the outer taper sleeve (3) and the adjustment plate (31) are integrally formed in one piece.

8. The permanent-magnet coupling self-alignment protection device in accordance with claim 6, characterized in that, the adjustment plate (31) is formed with a through-hole, the outer permanent-magnet rotor (2) is correspondingly formed with a screw hole that is coaxial with the through-hole, the first screw bolt (4) passes through the through-hole and is connected into the screw hole, the through-hole has a diameter larger than that of the first screw bolt (4).

9. The permanent-magnet coupling self-alignment protection device in accordance with claim 4, characterized in that, an air gap A is formed between the external wall of the inner sleeve (11) of the inner permanent-magnet rotor (1) and the sleeve (21) of the outer permanent-magnet rotor (2), the air gap A is in a range of 2 mm-5 mm.

10. The permanent-magnet coupling self-alignment protection device in accordance with claim 4, characterized in that, an air gap B is formed between the internal wall of the outer taper sleeve (3) and the external wall of the inner sleeve (11) of the inner permanent-magnet rotor (1), the air gap B is in a range of 0.3 mm-0.8 mm.

* * * * *